Feb. 3, 1970  F. S. BASTER  3,492,978
INTERNAL COMBUSTION ENGINE MANIFOLD
Filed Oct. 10, 1967  2 Sheets-Sheet 1

INVENTOR.
FOREST S. BASTER
BY
Watts, Hoffmann, Fisher & Heinke
ATTORNEYS.

INVENTOR.
FOREST S. BASTER

United States Patent Office 3,492,978
Patented Feb. 3, 1970

3,492,978
INTERNAL COMBUSTION ENGINE MANIFOLD
Forest S. Baster, Beachwood, Ohio, assignor to White Motor Corporation, Cleveland, Ohio, a corporation of Ohio
Filed Oct. 10, 1967, Ser. No. 674,228
Int. Cl. F02b 75/18, 75/22
U.S. Cl. 123—52
6 Claims

ABSTRACT OF THE DISCLOSURE

A V-block spark ignition gasoline engine with improved fuel distributing systems. The fuel distributing system includes a carburetor riser and intake manifold structure having a fuel chamber disposed adjacent the riser for receiving the fuel and air mixture therefrom and a plurality of passageways each opening into the chamber and extending to a different one of combustion chambers of the engine so that each combustion chamber is directly connected to the single fuel chamber.

CROSS-REFERENCED APPLICATIONS

Application for U.S. Letters Patent Ser. No. 676,421, filed Oct. 19, 1967 by Charles H. Fager, under the title "Internal Combustion Engine," and assigned to the assignee of this application.

BACKGROUND OF THE INVENTION

Field of the invention

The present invention relates to internal combustion engines and more particularly to internal combustion engines of the spark ignition type suitable for use in over-the-highway trucks.

Prior art

Diesel engines and gasoline fuel, spark ignition engines are commonly used to propel over-the-highway trucks or similar vehicles. Since diesel engines rely on compression of a fuel and air mixture to ignite the mixture, such engines operate at relatively high compression ratios. Accordingly, diesel engines are constructed of relatively heavy-duty components to accomodate pressure forces which are encountered during combustion. Diesel engine assemblies include fuel injection equipment, fuel filters, etc., and consequently a diesel engine assembly is generally relatively heavy and large in comparison to a gasoline engine.

Gasoline engines, when compared to diesel engines, have the advantages of better starting in cold weather and utilize much lower compression ratios due to the fact that the fuel and air mixture in a combustion chamber of the gasoline engine is ignited by an electrical spark. As a consequence of the relatively low compression ratios utilized in gasoline engines, such engines are generally relatively light and small and have a lower initial cost to the user. The lightness of the spark ignition engine provides for increased payload of a truck propelled by such an engine.

Generally, diesel engines have been preferred for over-the-highway tractors because:
(1) The fuel is relatively less expensive;
(2) The high torque which is generated by the engines; and
(3) Their reliability.

SUMMARY OF THE INVENTION

The present invention is directed to a spark ignition engine which:
(1) Develops high torque equal to or better than diesel engines of comparable horsepower; and
(2) Has high efficiency and reliability.

In accordance with the present invention, a spark ignition gasoline fuel engine for an over-the-road vehicle, such as a truck, is provided which has the diesel features of heavy-duty components. With the improved manifold system, the engine has relatively long life, low maintenance costs and fuel economy. The engine also exhibits the favorable spark ignition features of relatively light-weight, small size, low compression ratios and reliable cold-weather starting.

The intake manifold structure for the engine includes a central chamber positioned beneath a down-draft carburetor, and a plurality of generally radially extending passageways opening into the chamber and directly connecting the single fuel-air chamber with each of the combustion chambers through the inlet valves. With this novel manifold construction the fuel-air ratio produced by the carburetor is communicated uniformly to each combustion chamber to eliminate hot spots in the engine and fuel starvation of certain of the combustion chambers.

Accordingly, a principal object of the invention is the provision of a new and improved engine constructed to provide a spark ignition engine having heavy duty components and corresponding low maintenance costs of diesels, improved fuel economy, and high reliability.

Other novel advantageous features of the present invention will become apparent from a consideration of the following detailed description thereof made with reference to the accompanying drawings.

THE PREFERRED EMBODIMENT

Figure 1:
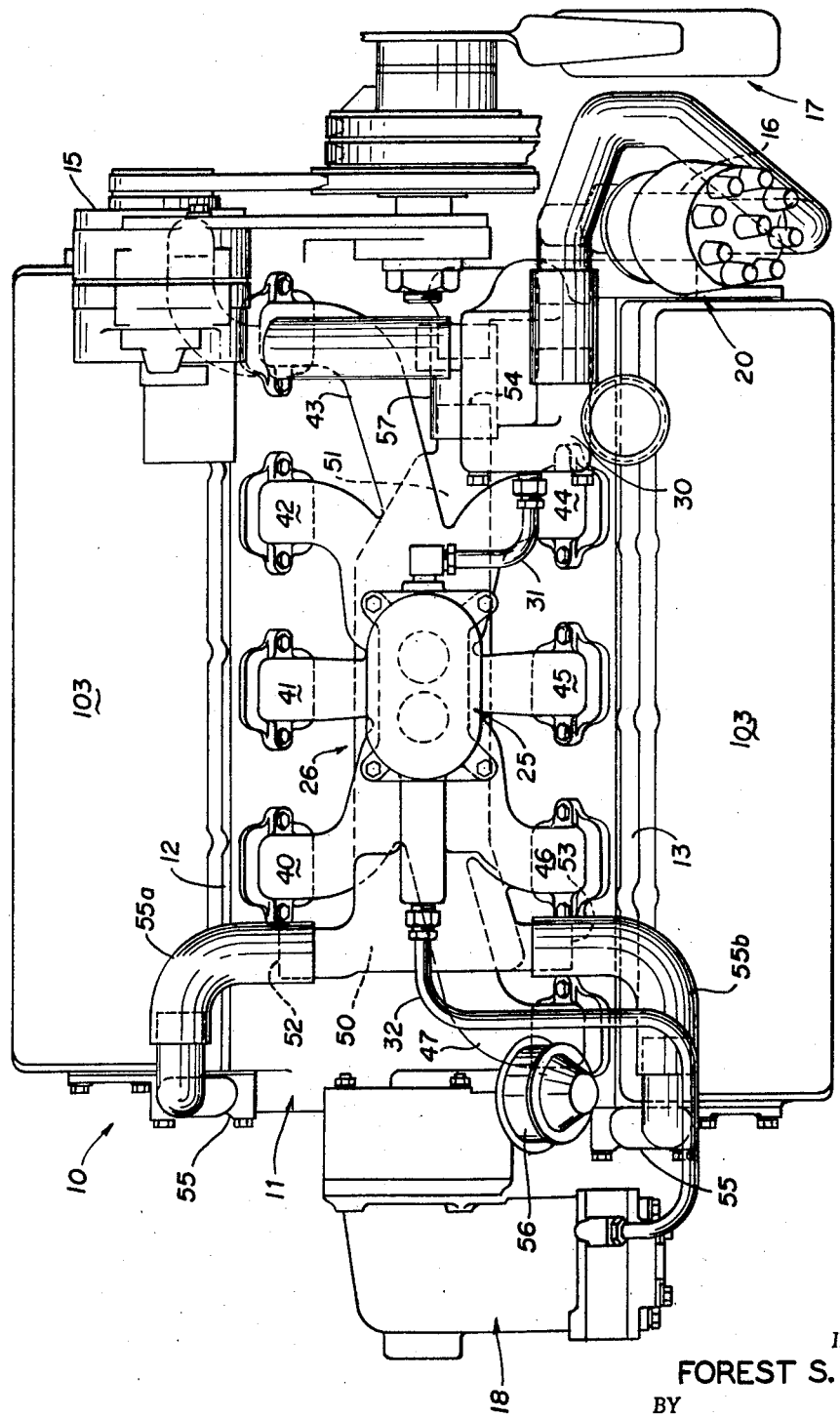
FIGURE 1 is a top plan view of an engine embodying the intake manifold of the present invention.
Figure 2:
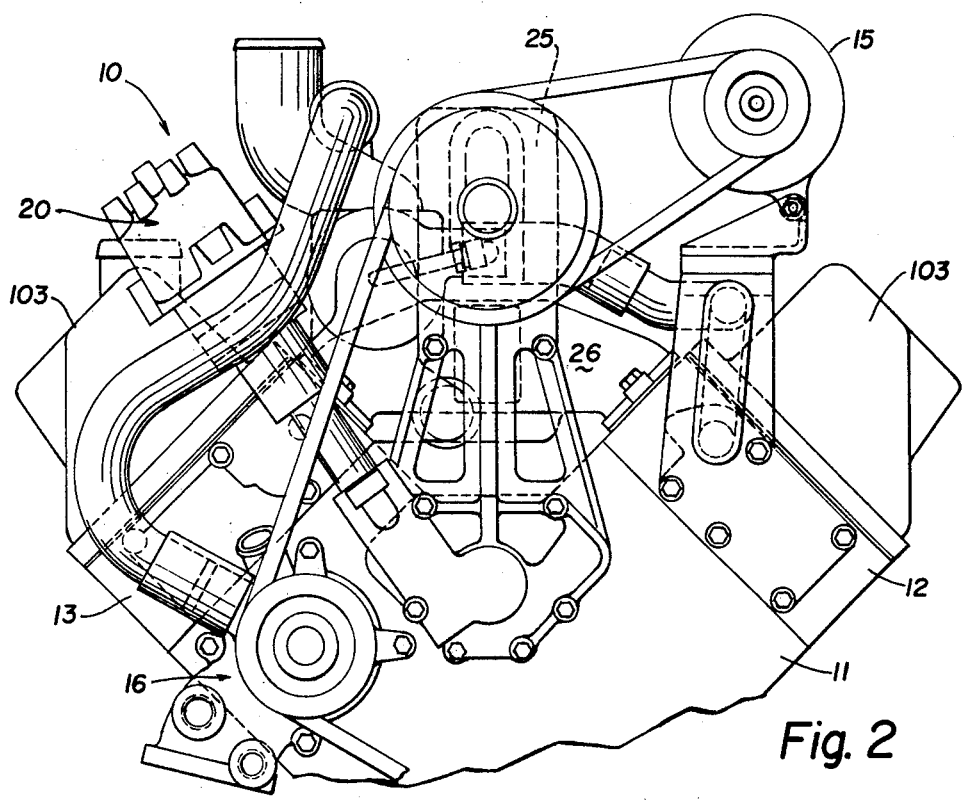
FIGURE 2 is a front elevational view of the engine of FIGURE 1.

An engine 10 embodying the present invention is illustrated in FIGURE 1. The engine combustion chamber and ignition system are described in greater detail in the above-referenced application of Charles H. Fager entitled "Internal Combustion Engine." The engine 10 includes a block 11 which supports a crankcase (not illustrated). The crankcase communicates with two rows of cylinders which are bored along axes lying in planes which converge in the crankcase. Thus, the block 11 is of the type which is commonly referred to as a V block. The cylinders in the block 11 are closed by cylinder heads 12, 13.

The cylinders contain pistons which are operative to rotate a crankshaft of the engine 10 which, in the case of an over-the-road vehicle, is linked to a propeller shaft and wheels of the vehicle by a suitable transmission, driveshaft and differential which are not illustrated. The crankshaft additionally drives auxiliary equipment associated with the engine which equipment is schematically shown as including an alternator 15, a water pump 16, and a cooling fan generally indicated at 17, all suitably connected to the crankshaft by way of driving belts and pulleys. The engine additionally drives an air compressor 18 and the rotor of a distributor 20. The distributor 20 is conventionally connected electrically with individual spark plugs in the cylinders of the engine so that electrical arcs are provided at the gaps of the spark plugs at appropriate times during the cycle of operation of the engine.

The water pump 16 provides a flow of cooling fluid through passageways which are formed in the engine block and cylinder heads and which conduct coolant through the block and cylinder heads for transferring heat away from the combustion chambers. The heated coolant is then directed through a conventional radiator (not shown) and returned to the intake of the water pump 16.

Air and fuel are supplied to the engine through a fuel distributing system including a conventional two-barrel, downdraft carburetor, not shown. The carburetor is carried by a riser 25 mounted on and forming a part of an intake manifold structure generally designated at 26. The manifold 26 is located beneath the riser 25 and communicable with the carburetor and with the combustion chambers of the engine.

The simplicity of the manifold construction, as compared with the prior art, results in more consistent production of high quality manifolds. It is believed that one reason this is true is that with conventional sand-casting techniques fewer internal flaws occur with a resultant reduction in turbulence in the flow of the fuel-air mixture. Moreover, all of the conduits 40–47 have minimal gradual bends deflecting the fuel-air mixture less than 90° in each case, thereby minimizing turbulence caused by relatively tortuous prior intake manifold passages.

Figure 3:
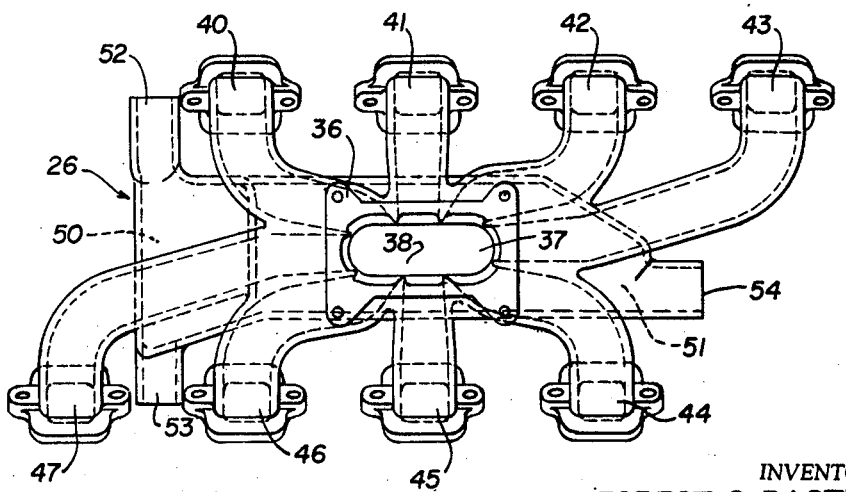
FIGURE 3 is a plan view of the intake manifold structure forming a part of the engine of FIGURE 1.

The manifold 26 (see FIGURE 3) is preferably a casting of suitable material such as cast iron and includes a central body portion having a flange 36 integrally formed at its upper side for connection with the riser 25 by suitable screws, not shown. The body defines a single, central chamber 37 located directly below the barrels of the carburetor and the riser 25 for receiving the fuel and air mixture from the carburetor. The chamber 37 communicates with the combustion chambers of the engine through conduits 40–47 defining passageways which open into the chamber 37.

As illustrated in FIGURE 1, the riser 25 is provided with internal passages for circulating heated engine coolant. Coolant from the compressor 18 passes through a tube 32 to the riser 25, to heat the riser and carburetor under certain conditions and to prevent carburetor icing. A riser outlet is connected to thermostat housing 30 by a riser return tube 32.

The conduits 40–47 are generally rectangular in cross section and they extend generally radially from the chamber 37 to the cylinder heads 12, 13. With this construction the fuel and air mixture provided by the carburetor to the chamber 37 is distributed without substantial change in the fuel-air ratio to each of the combustion chambers of the engine. Such structure minimizes "hot spots" which might otherwise be caused by too "lean" or too "rich" a mixture being provided in certain of the combustion chambers.

The conduits 40–47 are continuous with the body and converge into the chamber 37 so that the side walls of adjacent conduits are common adjacent the chamber 37. The conduits 40–42 and 46–44 are substantially symmetrical about the longitudinal axis of the chamber 37, while the conduits 43, 47 extend in opposite directions from ends of the chambers to intake valves of the combustion chambers remote from the carburetor. The chamber 37 includes a recessed portion 38 at its lower side.

The manifold 26 additionally includes a coolant chamber having inlet and outlet portions 50, 51 formed at opposite ends of the body. The coolant chamber is provided with inlet ports 52, 53 and an outlet port 54 which provide suitable connections with the cooling system. The inlet ports 52, 53 are connected to head outlets 55 by hoses 55a, 55b respectively. The outlet port 54 is connected to the thermostat housing 30 by a hose 57.

The conduits 40–47 of the intake manifold structure 26 each include a flange 60 at their ends remote from the chamber 37 and which flanges 60 are suitably fastened to flanges 60a formed on the cylinder heads 12, 13.

The cylinder heads 12, 13 are formed by suitable metal casting, preferably cast iron, and define intake passageways 61 communicating the intake manifold structure 26 with the combustion chambers, exhaust passageways for directing combustion products from the combustion chambers to an exhaust manifold for the engine (not shown) and the coolant passageways referred to previously for cooling the cylinder heads. The combustible mixture from the intake manifold structure 26 is directed into the combustion chambers of the engine through the intake passageways 61 in the cylinder heads 12, 13.

It will be recognized that the riser 25 is a part of the manifold 26 and can be integrally formed with it. The provision of a separate riser, however, provides flexibility if the engine is to be converted for use with a four-barrel rather than two-barrel carburetor, for example. In that event, it is only necessary to provide a different riser and not a different manifold assembly.

While a single embodiment of the present invention has been illustrated and described in considerable detail, the invention is not to be considered to be limited to the precise construction disclosed. It is the intention to cover hereby all adaptations, modifications, and uses of the present invention which come within the scope of the appended claims.

What is claimed is:
1. In a V-block eight-cylinder spark ignition engine having first and second cylinder heads defining regularly spaced inlet openings, an intake manifold structure comprising:
   (a) a body;
   (b) a single chamber defined by said body and communicable with a carburetor;
   (c) a plurality of conduits extending from said body and each defining a passageway having one end opening into said chamber;
   (d) each of said passageways defining an outlet at an opposite end communicable with an inlet opening in one of said heads to direct substantially uniform fuel and air mixtures to said inlet openings;
   (e) four of said passageways extending to said first cylinder head with said outlets in said opposite ends spaced uniformly apart, and four of said passageways extending to said second cylinder head with said outlets in said opposite ends spaced uniformly apart;
   (f) three of said pasageways extending to said first cylinder head being substantially symmetrical with three passageways extending to said second cylinder head about a line extending through said chamber and substantially parallel to said cylinder heads; and,
   (g) said fourth passageways extending to said first and second cylinder heads respectively, said fourth passageways opening into said chamber substantially along said line at opposite ends of said chamber and extending nonsymmetrically to said cylinder heads.

2. An intake manifold as defined in claim 1 wherein said body includes a flange at an upper side thereof for supporting a carburetor.

3. An intake manifold structure as defined in claim 2 wherein said body additionally defines at least one coolant chamber and inlet and output ports for said coolant chamber.

4. In an engine as claimed in claim 1 wherein the path of travel through each conduit to a combustion chamber curves less than substantially 90°.

5. In an engine as claimed in claim 1 wherein each of said opposite ends of said passageways is spaced substantially from opposite ends of adjacent passageways whereby a fuel and air mixture is introduced into combustion chambers at widely spaced locations along each of said cylinder heads.

6. In an engine as claimed in claim 1 wherein said passageways are devoid of common walls remote from said chamber.

References Cited

UNITED STATES PATENTS

| | | |
|---|---|---|
| 2,759,463 | 8/1956 | Platner. |
| 2,781,750 | 2/1957 | Chayne. |
| 2,808,041 | 10/1957 | Dolza. |
| 2,882,875 | 4/1959 | Kolbe. |
| 2,936,746 | 5/1960 | Rundquist. |
| 2,989,956 | 6/1961 | Drinkard et al. |
| 3,032,022 | 5/1962 | Malcolm et al. |

FOREIGN PATENTS

| | | |
|---|---|---|
| 620,251 | 3/1949 | Great Britain. |

WENDELL E. BURNS, Primary Examiner

U.S. Cl. X.R.

123—55